(12) United States Patent
 Weaver (10) Patent No.: US 10,580,536 B2
(45) Date of Patent: Mar. 3, 2020

(54) MACHINE-REPLACEABLE PLASMA-FACING TILE FOR FUSION POWER REACTOR ENVIRONMENTS

(71) Applicant: THE BOEING COMPANY, Chicago, IL (US)

(72) Inventor: Thomas Lyman Weaver, Chicago, IL (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 15/294,557

(22) Filed: Oct. 14, 2016

(65) Prior Publication Data
 US 2017/0069401 A1 Mar. 9, 2017

Related U.S. Application Data

(62) Division of application No. 12/612,533, filed on Nov. 4, 2009, now Pat. No. 9,472,309.

(51) Int. Cl.
 *G21B 1/13* (2006.01)
 *G21B 1/25* (2006.01)
 *G21B 1/11* (2006.01)

(52) U.S. Cl.
 CPC .................. *G21B 1/13* (2013.01); *G21B 1/25* (2013.01); *G21B 1/11* (2013.01)

(58) Field of Classification Search
 USPC ................. 376/100, 121, 131, 133, 136, 150
 See application file for complete search history.

(56) References Cited

U.S. PATENT DOCUMENTS

| | | | | | |
|---|---|---|---|---|---|
| 4,555,275 | A | * | 11/1985 | Tobin ...................... | C23C 10/60 148/277 |
| 4,619,807 | A | * | 10/1986 | Kotzlowski .............. | G21B 1/13 285/209 |
| 4,696,781 | A | * | 9/1987 | Bourque .................. | G21B 1/13 376/136 |
| 5,012,860 | A | * | 5/1991 | Mukherjee ............... | G21B 1/13 165/47 |
| 5,182,075 | A | | 1/1993 | Gotoh et al. | |

OTHER PUBLICATIONS

Busby, J., ITER iterations, Sanders Research Associates, Ltd., http://www.sandersresearach.com/index.php?option=com_content&task=view&id=1408&Itemid=103, May 5, 2009 (6pages).
Zhang, F. et al., ITER Shield Blanket Design Activities at SWIP, IT/P2-2, Jan. 2006 (8pages).

\* cited by examiner

*Primary Examiner* — Marshall P O'Connor
(74) *Attorney, Agent, or Firm* — Haynes and Boone LLP (57) ABSTRACT

An apparatus and method are disclosed for machine-replaceable plasma-facing tiles for fusion power reactor environments. The apparatus and method involve a tile that is fish scale shaped, and a tile support tube that is attached to the back portion of the tile. The tile support tube includes at least one coolant channel and at least one guard vacuum channel. In one or more embodiments, the method for removing the tile comprises providing a tile that is installed in a manifold channel of a first wall of a fusion power reactor, rotating the tile such that it is in an install/removal orientation, inserting two tines of a removal tool between the outer edges of the tile and the first wall of the fusion power reactor, rotating the removal tool such that the two tines grasp the tile support tube, and lifting the tile away from the wall with the removal tool.

20 Claims, 9 Drawing Sheets

MACHINE-REPLACEABLE PLASMA-FACING TILE FOR FUSION POWER REACTOR ENVIRONMENTS

CROSS-REFERENCE TO RELATED APPLICATION

This application is a Divisional application of, and claims the benefit of, U.S. patent application Ser. No. 12/612,533, filed Nov. 4, 2009, which is hereby incorporated by reference in its entirety.

BACKGROUND

The present disclosure relates to tiles for fusion power reactor environments. In particular, it relates to machine-replaceable plasma-facing tiles for fusion power reactor environments.

SUMMARY

The present disclosure relates to an apparatus, system, and method for machine-replaceable plasma-facing tiles for fusion power reactor environments. In one or more embodiments, the method for installing a machine-replaceable plasma-facing tile for fusion power reactor environments involves providing a tile, where the tile is fish scale shaped and has a tile support tube attached to the back portion of the tile. The method further involves inserting the tile support tube into a manifold channel of a first wall of a fusion power reactor such that the tile is in an install/remove orientation. Also, the method involves rotating the tile until the tile is in a locked orientation in the manifold channel of the first wall of the fusion power reactor. In some embodiments, the tile is rotated in a clockwise direction. In alternative embodiments, the tile is rotated in a counter-clockwise direction.

In one or more embodiments, the plasma-facing portion of the tile is manufactured from tungsten (W). In at least one embodiment, the back portion of the tile is manufactured from international thermonuclear experimental reactor-grade (ITER-grade) stainless steel. In some embodiments, the surface of the back portion of the tile is coated with an electrically insulating material. In at least one embodiment, the tile support tube includes at least one coolant channel. In one or more embodiments, each coolant channel is manufactured from international thermonuclear experimental reactor-grade (ITER-grade) stainless steel.

In one or more embodiments, a method for removing a machine-replaceable plasma-facing tile for fusion power reactor environments involves providing a tile that is installed in a locked orientation in a manifold channel of a first wall of a fusion power reactor. The tile is fish scale shaped, and has a tile support tube attached to the back portion of the tile. The method also involves rotating the tile until the tile is in an install/remove orientation. In some embodiments, the tile is rotated in a clockwise direction. In alternative embodiments, the tile is rotated in a counter-clockwise direction.

The method further involves providing a tile removal tool, where the tile removal tool comprises an elongated handle and two tines. One end of each tine is connected to a first end of the handle. Also, a second end of the handle is located opposite the first end of the handle. Further, the method involves rotating the second end of the handle of the removal tool such that the two tines are in an open state. Additionally, the method involves inserting the two tines of the removal tool between the outer edges of the tile and the first wall of the fusion power reactor. Also, the method involves rotating the second end of the handle of the removal tool such that the tines are in a closed state and grasp the tile support tube. The method further involves lifting the tile away from the first wall of the fusion power reactor with the removal tool such that the tile is completely removed from the manifold channel of the first wall of the fusion power reactor.

In one or more embodiments, a machine-replaceable plasma-facing tile apparatus for fusion power reactor environments comprises a tile that is fish scale shaped, and a tile support tube that is attached to a back portion of the tile. In some embodiments, the tile support tube includes at least one coolant channel and at least one guard vacuum region. In at least one embodiment, at least one coolant channel is in a vertical orientation. In one or more embodiments, at least one coolant channel is in a horizontal orientation.

DRAWINGS

These and other features, aspects, and advantages of the present disclosure will become better understood with regard to the following description, appended claims, and accompanying drawings where:

DESCRIPTION

The methods and apparatus disclosed herein provide an operative system for tiles for fusion power reactor environments. Specifically, this system allows for machine-replaceable plasma-facing tiles for fusion power reactor environments. The system of the present disclosure teaches an easily machine-replaceable high heat and radiation flux tolerant tile for lining the inner wall of a fusion reactor that produces power-plant levels of heat and radiation flux. The tile of the present system protects the underlying structures of the reactor from damage by plasma impact as well as from tritium and alpha particle infiltration from a fusing deuterium ($^2$H)-tritium ($^3$H) nuclear reaction in a magnetically confined plasma.

Projections from current experiments indicate that the plasma in a fusion power reactor will be sufficiently energetic such that in a well controlled reactor, it will be capable of destroying the innermost layer of the plasma chamber in a matter of weeks to months. Currently, there is no known economically acceptable way to replace the interior of the reactor every few months.

There are three ways to mitigate this problem. The first way is to better control the plasma such there are fewer plasma impacts on the first interior wall of the reactor. The second way is to manufacture the first interior wall of the reactor from materials that are able to tolerate many plasma impacts. And, the third way is to manufacture the first interior wall such that it is easy and cheap to replace, and such that it protects the other wall layers that lie behind it. In addition, projections from current experiments and the state of the art in technologies for control and materials also indicate that all three approaches will be required for a viable fusion reactor. The system of the present disclosure addresses the third approach.

Another problem realized from current experiments is that, in reactor conditions, most known materials become somewhat permeable to tritium ($^3$H), which is the radioactive component of the fuel of the reactor. This permeability allows the materials that line the reactor chamber to absorb some tritium. As such, the materials become slightly radioactive themselves. This causes some tritium to pass through the materials, thereby causing some of the radioactive tritium fuel to leak away. The system of the present disclosure also addresses the tritium permeability problem.

Currently, there are several proposed solutions to address these above-discussed problems. The first proposed solution is to build plasma control systems that are able to reduce plasma impacts from several per minute to several per month. The second proposed solution is to find a material that is able to tolerate multiple plasma impacts per minute in the high heat and radiation flux environment of a fusion power reactor without suffering significant erosion, embrittlement, and absorption of tritium. The third proposed solution is to replace the multi-ton first wall/breeding blanket structures lining the interior of the fusion power reactor every few months. However, it should be noted that none of the above-mentioned proposed solutions have yet been developed beyond the concept stage, let alone demonstrated.

Also, there are several notable disadvantages to these three proposed solutions. The first disadvantage is that control systems have not been built that are able to reduce plasma impacts from several per minute to one per month, and may never be possible. The second disadvantage is that models and experiments indicate that there is no known material that will survive more than ten fusion power reactor level plasma impacts near the same spot without suffering significant material erosion. And, the third disadvantage is that replacing the multi-ton first wall/breeding blanket structures lining the interior of the fusion power reactors will be so difficult and expensive that it will be impractical to replace these structures at any rate exceeding once every three years.

Several constraints must be solved simultaneously for the first interior wall of a fusion power reactor. These constraints are as follows. The first constraint is that the energy flux through the first wall, which is in the form of neutrons, gammas, and alpha particles, will exceed 1 mega Watt per square meter ($MW/m^2$). The second constraint is that, for efficient thermodynamics of the power reactor and for the effective use of the reactor for the production of hydrogen, the first wall (and breeding blanket) coolant outlet temperature should be at least 700° Celsius (C), and preferably will be 950° C. The third constraint is that neutrons from the reaction are energetic enough to break any molecular bond and knock metal atoms out of their original positions in the metal lattice.

The fourth constraint is that the first wall must not release vapors into the vacuum surrounding the plasma. The fifth constraint is that the first wall must be manufactured from materials that have a minimal propensity for neutron activation. The sixth constraint is related to the fact that some alpha particles from the reaction will enter the first wall and become trapped. There, the alpha particles will pick up electrons, thereby becoming neutral helium atoms. Eventually enough atoms will accumulate to form bubbles in the material of the wall. As such, the first wall must tolerate or neutralize these bubbles.

The seventh constraint is related to the fact that tritium from the fuel will enter the first wall material, thereby making the material both brittle and slightly radioactive. Thus, the first wall must have a way to mitigate the brittleness and remove the tritium. The eighth constraint is that the first wall must be able to tolerate plasma impacts or be easily replaceable after damage from impacts, but before accumulated damage breaches the first wall. The ninth constraint is that the first wall must be very thin such that it does not interfere with the transit of neutrons from the reaction through the first wall and into the breeding blanket located behind the first wall.

The tenth constraint is that the first wall must be repairable or replaceable by machine. Despite the intent to build fusion reactors from materials that are not prone to neutron activation, an activation will occur. This means that the reactor will become radioactive itself to a level such that it will not be approachable by human maintainers until after being off for approximately one month. And, the eleventh constraint is that the elements of the first wall must be recyclable after only a short cooling period, even if the recycling only consists of the elements being made into new tiles for fusion reactors. The system of the present disclosure addresses the above constraints in a variety of ways. These various ways are discussed in detail below.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
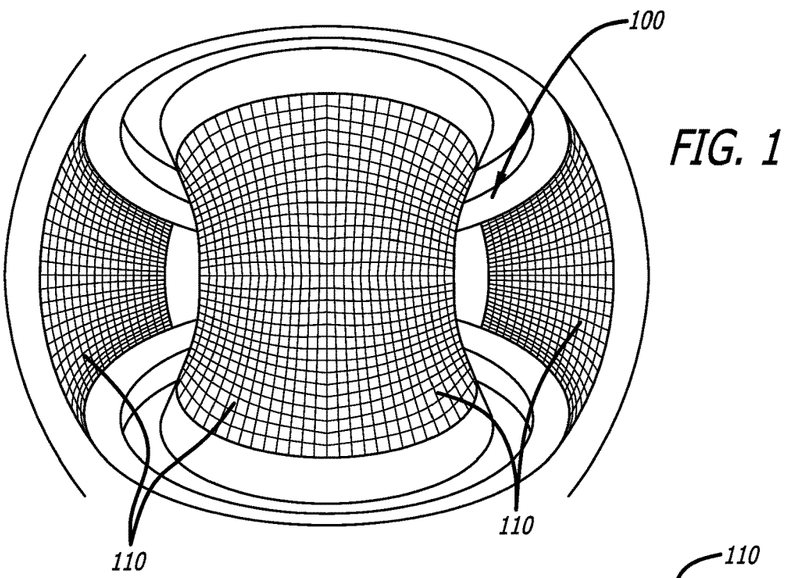
FIG. 1 is an illustration of the interior of a fusion power reactor, in accordance with at least one embodiment of the present disclosure.

FIG. 1 is an illustration of the interior of a fusion power reactor 100, in accordance with at least one embodiment of the present disclosure. In this figure, it can be seen that the fusion power reactor 100 is of a torus shape. It should be noted that the system of the present disclosure can be used with various different types and shapes of fusion power reactors. The first wall of the fusion power reactor 100 is lined with small tile apparatus units 110.

Each small tile apparatus unit 110 is individually replaceable. Tile installation and removal is performed by a remote robotic maintenance system that enters the plasma chamber through an access port. An example of a remote robotic maintenance system is the Mascot remote maintenance device that used for the Joint European Torus fusion energy experiment. It should be noted that various other types of remote robotic maintenance systems may be used for the system of the present disclosure. The remote robotic maintenance system will need only simple tools, such as those shown in FIG. 6 to install and remove the tile apparatus units 110.

Figure 2:
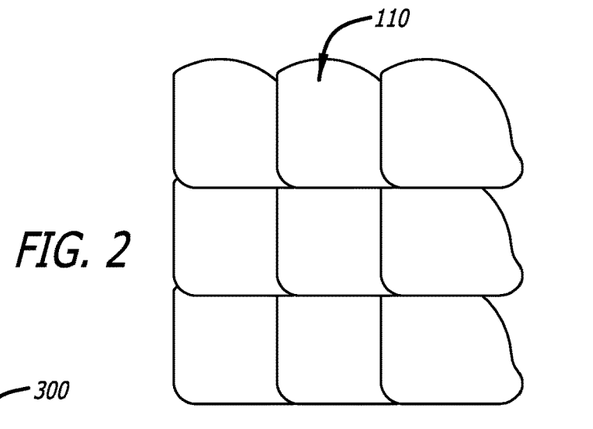
FIG. 2 shows the overlapping fish scale arrangement of the tiles that are installed on the interior wall a fusion power reactor, in accordance with at least one embodiment of the present disclosure.

The tiles apparatus units 110 that line the first wall of the fusion power reactor 100 overlap each other in a fish scale pattern. FIG. 2 shows the overlapping fish scale arrangement of the tile apparatus units 110 that are installed on the interior wall a fusion power reactor, in accordance with at least one embodiment of the present disclosure.

Figure 3:
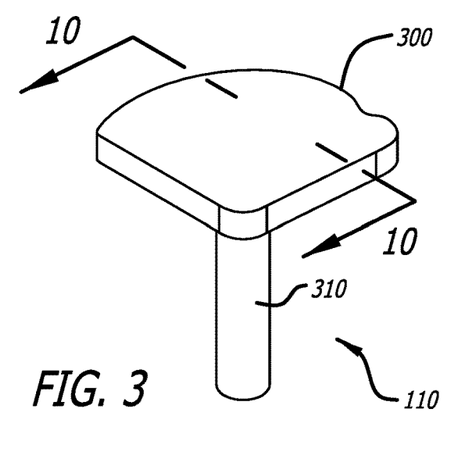
FIG. 3 is a depiction of a single machine-replaceable plasma-facing tile apparatus for fusion power reactor environments, in accordance with at least one embodiment of the present disclosure.

FIG. 3 is a depiction of a single machine-replaceable plasma-facing tile apparatus 110 for fusion power reactor environments, in accordance with at least one embodiment of the present disclosure. Each machine-replaceable plasma-facing tile apparatus 110 comprises a tile 300 that is fish scale shaped, and a tile support tube 310. The tile support tube 310 is attached to the back portion of the tile 300. In one or more embodiments, the tile support tube 310 includes at least one coolant channel (not shown in figure) and/or at least one guard vacuum region (not shown in figure).

Figure 4A:
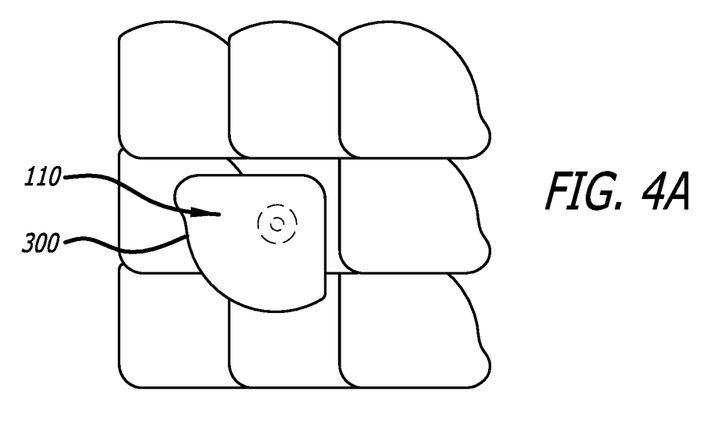
FIGS. 4A and 4B illustrate the steps for installing a machine-replaceable plasma-facing tile apparatus for fusion power reactor environments, in accordance with at least one embodiment of the present disclosure.
Figure 4B:
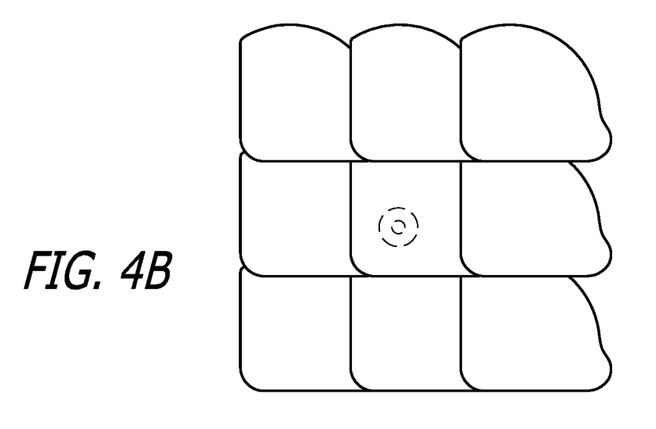

FIGS. 4A and 4B illustrate the steps for installing a machine-replaceable plasma-facing tile apparatus 110 for fusion power reactor environments, in accordance with at least one embodiment of the present disclosure. For FIGS. 4A and 4B, the spot on the tile 300 of the tile apparatus 110 indicates the axis on which the tile apparatus 110 rotates. And, the circle on the tile 300 indicates the location of the tile support tube 310 (not shown in figure), which is attached to the back portion of the tile 300 of the tile apparatus 110.

For the first step, which is shown in FIG. 4A, the tile apparatus 110 has its tile support tube 310 (not shown in figure) inserted into a manifold channel of a first wall of a fusion power reactor such that the tile apparatus 110 is in an install/remove orientation. For the second step, which is shown in FIG. 4B, the tile apparatus 110 is rotated until it is in a locked orientation in the manifold channel of the first wall of the fusion power reactor. In one or more embodiments, for the second step, the tile apparatus 110 is rotated in a clockwise direction. In alternative embodiments, for the second step, the tile apparatus 110 is rotated in a counter-clockwise direction.

FIGS. 5A through 5H depict the steps for removing a machine-replaceable plasma-facing tile apparatus 110 for fusion power reactor environments, in accordance with at least one embodiment of the present disclosure. For FIGS. 5A through 5H, the spot on the tile 300 of the tile apparatus 110 indicates the axis on which the tile apparatus 110 rotates. And, the circle on the tile 300 indicates the location of the tile support tube 310 (not shown in figure), which is attached to the back portion of the tile 300 of the tile apparatus 110.

Figure 5A:
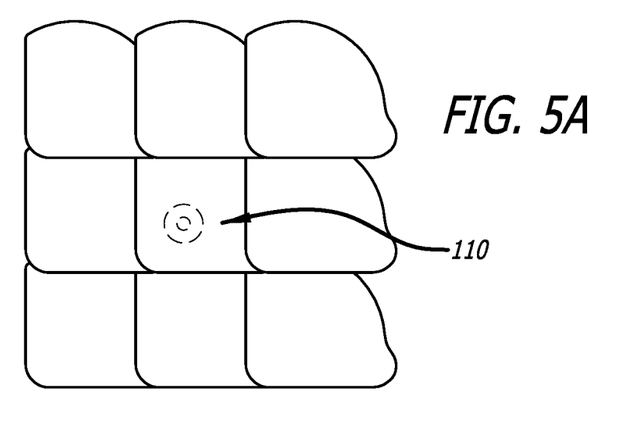
FIGS. 5A through 5H depict the steps for removing a machine-replaceable plasma-facing tile apparatus for fusion power reactor environments, in accordance with at least one embodiment of the present disclosure.
Figure 5B:
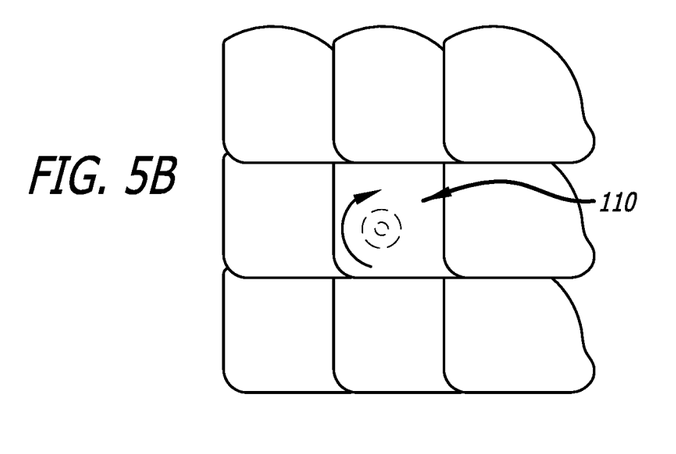
Figure 5C:
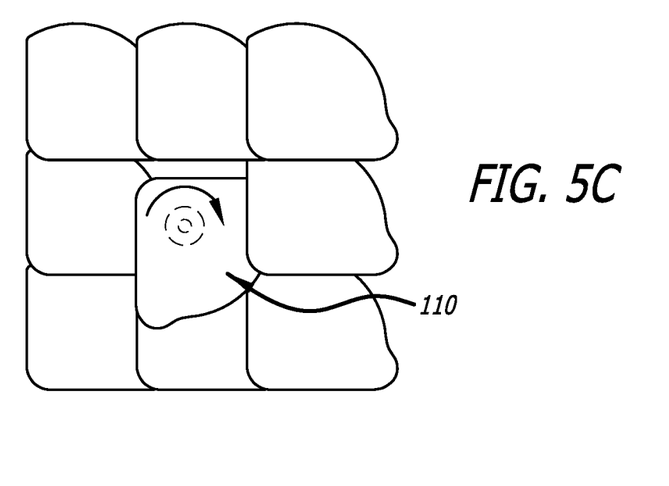
Figure 5D:
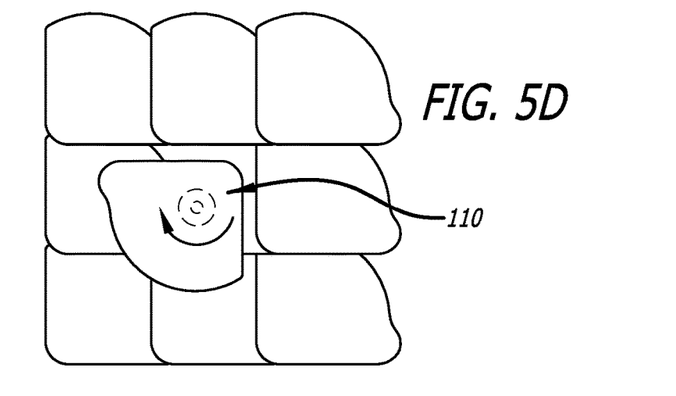
Figure 5E:
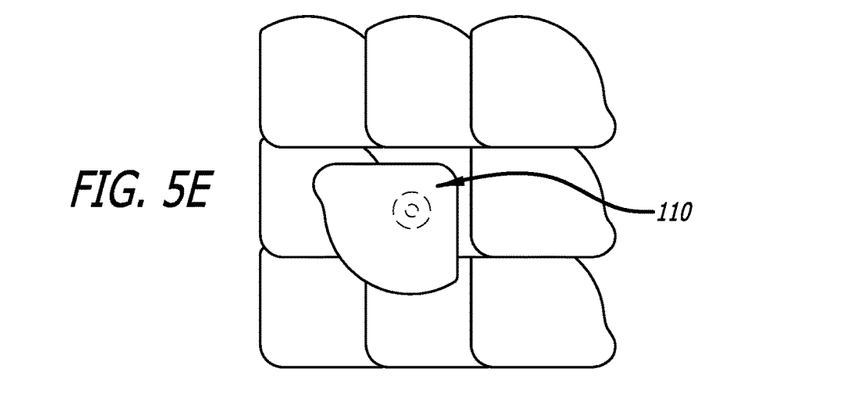

For the first step, which is shown in FIG. 5A, a tile apparatus 110 is installed in a locked orientation in a manifold channel of a first wall of a fusion power reactor. For the second step, which is shown in FIGS. 5B through 5E, the tile apparatus 110 is rotated until the tile apparatus 110 is in the install/remove orientation. In one or more embodiments, for the second step, the tile apparatus 110 is rotated in a counter-clockwise direction. In alternative embodiments, for the second step, the tile apparatus 110 is rotated in a clockwise direction.

Figure 6:
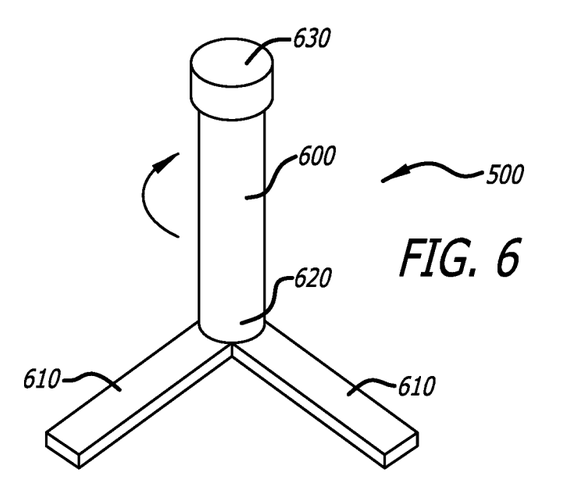
FIG. 6 is an illustration of a tile removal tool, in accordance with at least one embodiment of the present disclosure.

A tile removal tool 500 is used for the third step of the installation procedure. FIG. 6 shows an illustration of a tile removal tool 500, in accordance with at least one embodiment of the present disclosure. The tile removal tool 500 comprises an elongated handle 600 and two tines 610. One end of each tine 610 is connected to a first end 620 of the handle 600. A second end 630 of the handle is located opposite the first end 620 of the handle 600.

Figure 5F:
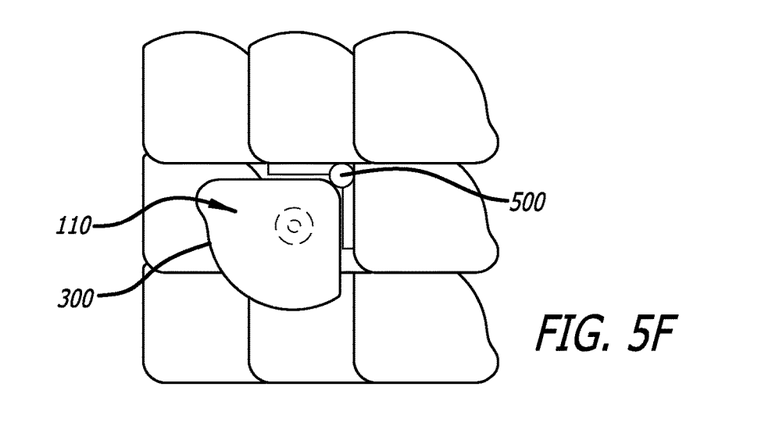
Figure 7A:
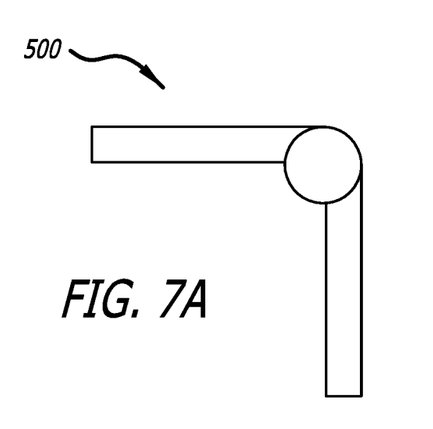
FIG. 7A shows a top view of the tile removal tool in an open state, in accordance with at least one embodiment of the present disclosure.

For the third step, the second end 630 of the handle 600 of the tile removal tool 500 is rotated such that the two tines 610 are in an open state. In one or more embodiments, the second end 630 of the handle 600 of the tile removal tool 500 is rotated in a clockwise direction in order to orient the two tines 610 in an open state. In alternative embodiments, the second end 630 of the handle 600 of the tile removal tool 500 is rotated in a counter-clockwise direction in order to orient the two tines 610 in an open state. FIG. 7A shows a top view of the tile removal tool 500 in an open state, in accordance with at least one embodiment of the present disclosure. For the fourth step, which is shown in FIG. 5F, the two tines 610 of the tile removal tool 500 are inserted between the outer edges of the tile 300 and the first wall of the fusion power reactor.

Figure 5G:
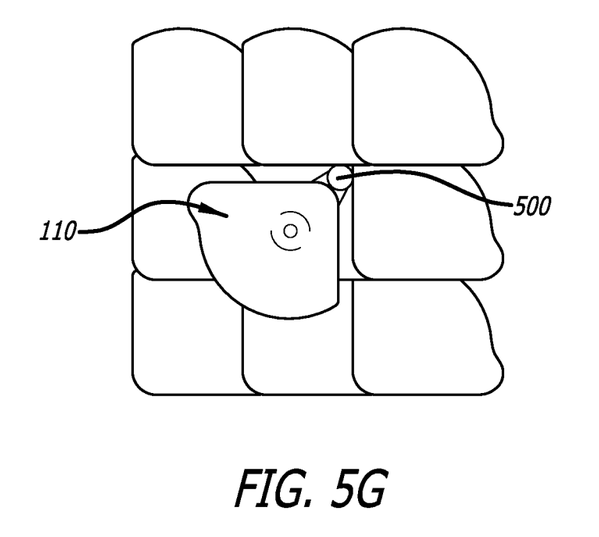
Figure 5H:
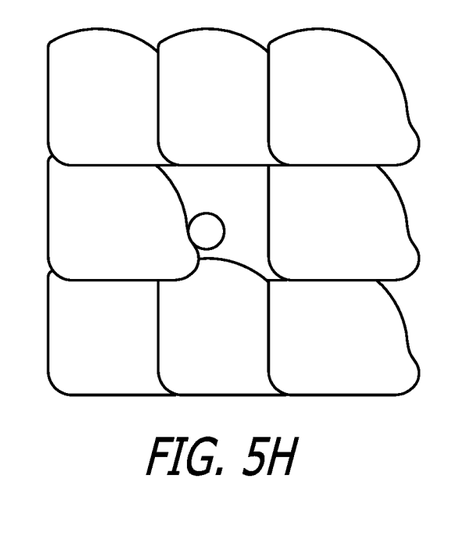
Figure 7B:
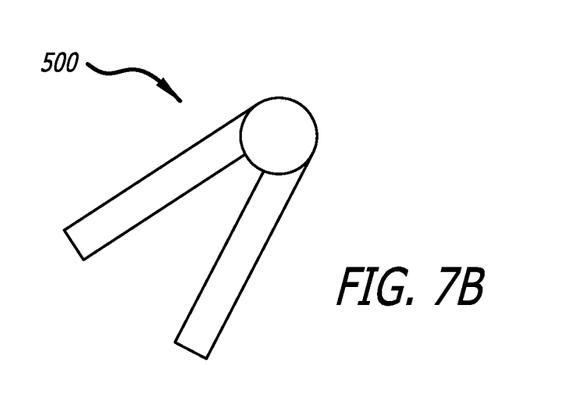
FIG. 7B shows a top view of the tile removal tool in a closed state, in accordance with at least one embodiment of the present disclosure.
Figure 8A:
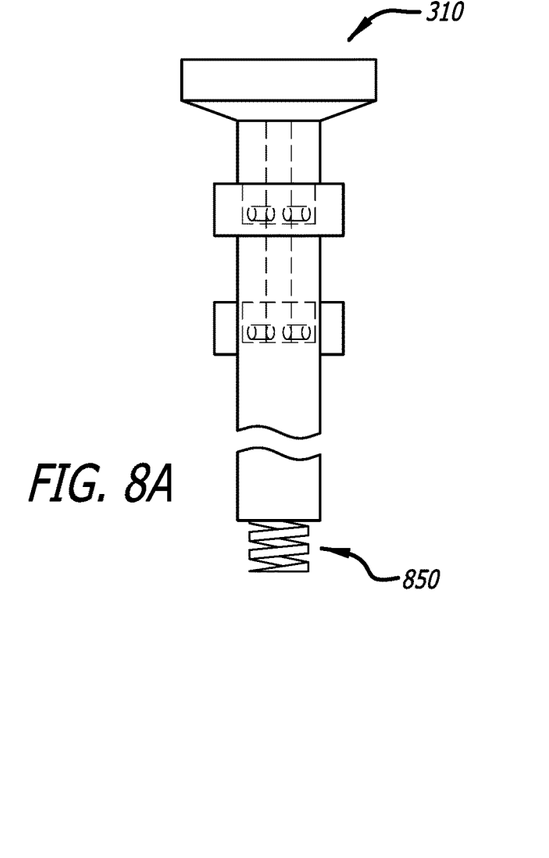
FIG. 8A is an illustration of a front view of a tile support tube of a machine-replaceable plasma-facing tile apparatus, in accordance with at least one embodiment of the present disclosure.
Figure 8B:
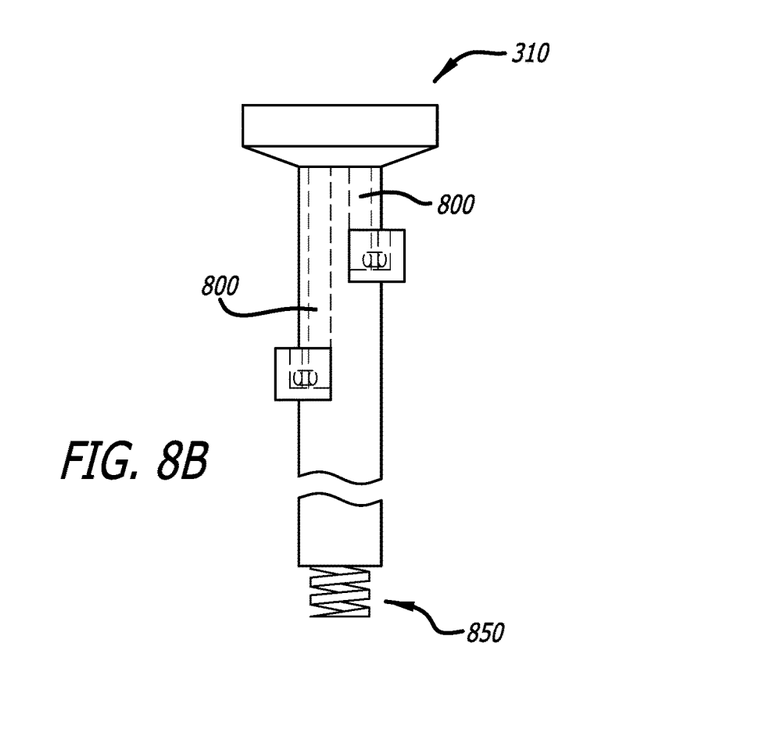
FIG. 8B is an illustration of a side view of a tile support tube of a machine-replaceable plasma-facing tile apparatus, in accordance with at least one embodiment of the present disclosure.
Figure 8C:
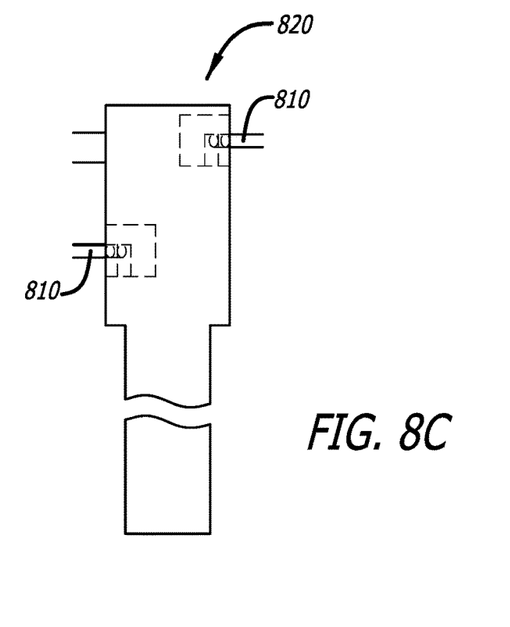
FIG. 8C is an illustration of a side view of a manifold channel of a first wall of a fusion power reactor, in accordance with at least one embodiment of the present disclosure.
Figure 8D:
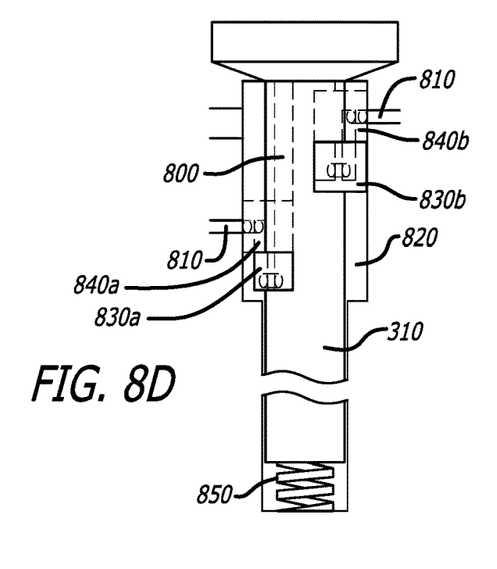
FIG. 8D is an illustration of a side view of a tile support tube, of a machine-replaceable plasma-facing tile apparatus, that is installed in a manifold channel of a first wall of a fusion power reactor, in accordance with at least one embodiment of the present disclosure.

For the fifth step, which is shown in FIG. 5G, the second end 630 of the handle 600 of the tile removal tool 500 is rotated such that the two tines 610 are in a closed state and grasp the tile support tube 310 (not shown in figure). In one or more embodiments, the second end 630 of the handle 600 of the tile removal tool 500 is rotated in a counter-clockwise direction in order to orient the two tines 610 in a closed state. In alternative embodiments, the second end 630 of the handle 600 of the tile removal tool 500 is rotated in a clockwise direction in order to orient the two tines 610 in a closed state. FIG. 7B shows a top view of the tile removal tool 500 in a closed state, in accordance with at least one embodiment of the present disclosure. For the sixth step, which is shown in FIG. 5H the tile apparatus 110 has been lifted away from the first wall of the fusion power reactor with the removal tool such that the tile apparatus 110 is completely removed from the manifold channel of the first wall of the fusion power reactor.

For the system of the present disclosure, it should be noted that the tiles 300 are not intended to seat tightly against each other. Their purpose is to be a sacrificial first wall that is easily replaceable, and protects the structures that lie behind it. The tiles 300 will overlap, and should touch, but only if the outermost surface of the back sides of the tiles 300 are electrically insulating. Because if the tiles touch and can conduct electric currents from one tile 300 to another, there is too great of a chance of the tiles 300 being welded to each other by plasma disruptions, which would make replacement of damaged tile apparatus units 110 difficult. The reason the tiles 300 should touch is so that they can provide some mechanical support to each other to help them resist the electromagnetic forces that are generated during plasma disruptions. However, the tiles 300 must not lock or seal to each other as electromagnetic forces could damage an interlocking system in ways that could prevent it from being unlocked.

Because the tiles 300 are not sealed against each other, the tiles apparatus units 110 need to have a portion of their interior channels employed by a vacuum pumping system, which is located behind the tiles 300. This will serve several purposes. First it will prevent the build-up of gases behind the tiles 300. Second, it will prevent any gas that is leaking from the tile attachment system from getting into the plasma. And, third it will allow the size of the main vacuum pumping ports to be reduced.

In one or more embodiments, the tile apparatus units 110 are made entirely of refractory materials. This feature will prevent the tile apparatus units 110 from releasing vapors into the vacuum. The refractory materials to be used for the tile apparatus units 110 have low neutron activation cross sections and are able to resist plasma impacts. These features will facilitate the recycling of the tile apparatus units 110. Examples of materials to be used for the tile apparatus units 110 include, but are not limited to, tungsten (W) for the plasma-facing portions of the tiles 300, and international thermonuclear experimental reactor-grade (ITER-grade), low activation, stainless steel for the back portions of the tiles 300, the tile coolant channels, and the tile support tubes 310. In some embodiments, the outermost surface of the back portion of each tile 300 is coated with an electrically insulating material, such as silicon carbide (SiC) or tungsten carbide (WC).

In one or more embodiments, the tiles 300 are hollow and thin-walled, and have a cooling fluid, such as helium (He), that possibly contains a tracer consisting of another noble gas (e.g. argon (Ar)), flowing through them. The thin walls of the tiles 300 allow for neutrons to pass largely unimpeded through the tiles 300 into the breeding blanket. Because of their charge, tritons (tritium nuclei) do not pass through metals as easily as neutrons. Tritons escaping from the plasma will mostly be stopped on or in the tile 300 walls, where they will be neutralized. Once neutralized, the tritium atoms have some ability to migrate through metals. The thin walls of the tiles 300 will allow tritium entering into the tiles to easily migrate through the walls into the helium coolant, which will carry them away for chemical capture.

The fusion reactions will also produce alpha particles, most of which will stop in the tile 300 walls like the tritons. As with the tritium, the thin tile 300 walls will allow helium forming from the alpha particles to easily diffuse to the coolant channel for removal with only minimal damage to the walls themselves, because the distance the helium must migrate will be very short. The coolant will enter and leave the tiles 300 through tubes that project radially outward from the tiles 300 (i.e. the coolant channels in the tile support tubes 310) through the breeding blankets to connections to the helium supply and the return manifolds, which could be located inside or beyond the breeding blankets.

Because the tile apparatus units 110 are rotated during the installation and removal process, a very simple method for attaching the tile apparatus units 110 and making the coolant connections is possible. The attachment and connection methods must be simple, so as to minimize the possibility that electromagnetic forces occurring during a disruption will distort the tile 300 and tile support tube 310 so greatly that the tile apparatus unit 110 cannot be easily removed.

There are several ways the attachment can be accomplished. But the simplest, which is the preferred embodiment, is to have the tile support tubes 310 manufactured to have one or more sets of offset semi-circular shoulders and to have similar semi-circular shoulders located on the inside of the manifold channels into which the tile support tubes 310 are inserted. By rotating the tile apparatus units 110 multiple times during installation, or by rotating the tile apparatus units 110 multiple times back and forth through by half circles, the offset shoulders on each tile support tube 310 can be made to clear the offset shoulders in each manifold channel until the tile support tube 310 is fully inserted.

FIGS. 8A through 8D show an example of a way to manufacture the offset shoulders on a tile support tube 310 that attaches to a manifold channel 820 in the breeding blanket. In the event that the coolant manifold is located beyond the breeding blanket, rather than being in it, the tile support tubes 310 will be manufactured to be much longer in length, and they will each have at least two sets of shoulders. The set of shoulders located closest to the plasma will be only for mechanical support. And, a second set of shoulders will be located farther from the plasma, where they can engage the coolant passages in a manifold beyond the blanket.

FIGS. 8A through 8D also show an example way that inlet and outlet coolant connections can be made between the coolant channels 800 of a tile support tube 310 and the coolant channels 810 in a manifold channel 820. These figures show the routing of coolant channels 800 in a tile support tube 310 such that they come to the inboard faces of the shoulders on the tile support tube 310, and mate to corresponding coolant channels 810 located on the outboard faces of the shoulders in the manifold channel 820. The simplest way to make these connections is to start by manufacturing the tile support tubes 310 and the walls of the manifold channels 820 of the same material, such as ITER-grade stainless steel. That will minimize problems from differential thermal expansion of various parts, and will allow for the use of simple metallic, such as copper (Cu), seals between the faying steel surfaces.

In addition, FIGS. 8A through 8D show a simple way to make the seal between the shoulders 830a, 830b of the tile support tube 310 and the shoulders 840a, 840b of the manifold channel 820, which is to simply have a spring 850 attached to the end of the tile support tube 310, which pushes the shoulders up against each other (e.g., for a first set of shoulders, shoulder 830a is pushed up against shoulder 840a; and for a second set of shoulders, shoulder 830b is pushed up against 840b). In one or more embodiments, the spring 850 is a captive spring such that it can be easily replaced if thermal cycling or radiation damages it.

Figure 9A:
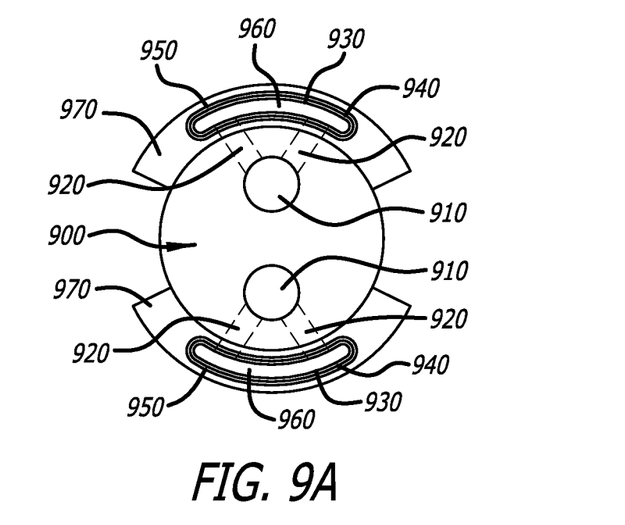
FIG. 9A depicts a top view of a tile support tube of a machine-replaceable plasma-facing tile apparatus, in accordance with at least one embodiment of the present disclosure.
Figure 9B:
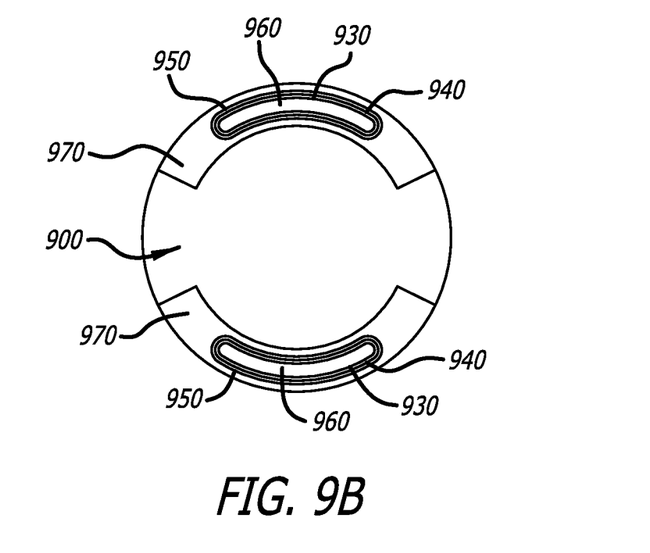
FIG. 9B shows a bottom view of a tile support tube of a machine-replaceable plasma-facing tile apparatus, in accordance with at least one embodiment of the present disclosure.

It should be noted that because of the intense radiation environment, the seals cannot be made from elastomeric materials, and are metal. Because the seals are simple, there is a possibility of an occurrence of unacceptable leakage of radiation. Possible leakage is prevented from being a problem by the use of a standard vacuum system technology, such as a guard vacuum. A guard vacuum is simply a separate volume that is located between two volumes having different pressures. The guard vacuum usually has a pressure that is between the pressures of the two volumes being separated. A guard vacuum reduces leakage through vacuum seals by reducing the pressure difference across each seal. Simply adding two seals might appear to accomplish the same thing. However, if two seals are implemented, the space between them traps gas, which leaks out very slowly, and is called a "virtual leak". The creation of a guard vacuum eliminates the risk of creating a virtual leak between the two seals. FIGS. 9A and 9B show in detail views from above and below of the coolant connection system.

FIG. 9A depicts a top view of a tile support tube 310 of a machine-replaceable plasma-facing tile apparatus and FIG. 9B shows a bottom view of a tile support tube 310 of a machine-replaceable plasma-facing tile apparatus, in accordance with at least one embodiment of the present disclosure. In FIG. 9A, it can be seen that the tile support tube 310 contains a tube support body 900, two vertical coolant channels 910, four horizontal coolant channels 920, two guard vacuum regions 930, two first vacuum seals 940, two second vacuum seals 950, two tube shoulders 970, and two coolant passages 960 in the tube shoulders 970. From FIG. 9B, it can be seen that the tile support tube contains a tube support body 900, two guard vacuum regions 930, two first vacuum seals 940, two second vacuum seals 950, two tube shoulders 970, and two coolant passages 960 in the tube shoulders 970.

Variations on the attachment system can be developed in the event that the disclosed simple approach does not hold the tile support tubes 310 firmly enough, or if the coolant seals require more normal force to work properly. For example, tile support tubes 310 could be made of copper (Cu), while the manifold channels 820 that they are set into are formed from ITER-Grade stainless steel. Copper is acceptable in the fusion environment, as long as copper alloys containing high-neutron activation elements, such as nickel (Ni), are avoided. If copper is used for the tile support tube 310, and a lower set of mechanical stops is put in the manifold channel 820 in addition to the spring 850, then when the system heats during operation, the copper will expand more than the stainless steel. That will cause the distance between the stop and the coolant connection shoulders on the tile support tube 310 to grow more than the distance between the stop and the coolant connection shoulders in the manifold channel 820. The effect of that will be that, as the device heats, the force will grow with which the faying surfaces and the seal for the coolant connections are pushed together.

Figure 10:
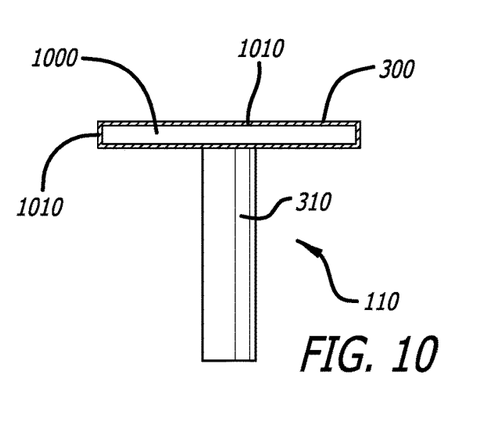
FIG. 10 is a cross-sectional view of the single replaceable plasma-facing tile apparatus for fusion-power reactor environments of FIG. 3 illustrating that the tile is hollow and thin-walled, in accordance with at least one embodiment of the present disclosure.

FIG. 10 is a cross-sectional view of the single replaceable plasma-facing tile apparatus 110 for fusion-power reactor environments of FIG. 3 illustrating the tile 300 that is hollow 1000 and thin-walled 1010, in accordance with at least one embodiment of the present disclosure.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A machine-replaceable plasma-facing tile apparatus for fusion power reactor environments, comprising:
   a tile;
   a tile-support tube, attached to a back portion of the tile, and wherein the tile-support tube comprises at least one coolant channel and at least two sets of shoulders; and
   a spring, attached to an end of the tile-support tube, and wherein the spring is configured to push the at least two sets of shoulders up against each other.

2. The machine-replaceable plasma-facing tile apparatus of claim 1, wherein the at least one coolant channel is in a vertical orientation.

3. The machine-replaceable plasma-facing tile apparatus of claim 1, wherein the at least one coolant channel is in a horizontal orientation.

4. The machine-replaceable plasma-facing tile apparatus of claim 1, wherein a plasma-facing portion of the tile is manufactured from tungsten (W).

5. The machine-replaceable plasma-facing tile apparatus of claim 1, wherein the tile is fish-scale shaped.

6. The machine-replaceable plasma-facing tile apparatus of claim 1, wherein the back portion of the tile is manufactured from international thermonuclear experimental reactor-grade (ITER-grade) stainless steel.

7. The machine-replaceable plasma-facing tile apparatus of claim 1, wherein a surface of the back portion of the tile is coated with an electrically insulating material.

8. The machine-replaceable plasma-facing tile apparatus of claim 7, wherein the electrically insulating material is silicon carbide (SiC).

9. The machine-replaceable plasma-facing tile apparatus of claim 7, wherein the electrically insulating material is tungsten carbide (WC).

10. The machine-replaceable plasma-facing tile apparatus of claim 1, wherein the at least one coolant channel is manufactured from international thermonuclear experimental reactor-grade (ITER-grade) stainless steel.

11. The machine-replaceable plasma-facing tile apparatus of claim 1, wherein the at least one coolant channel is perpendicular to the back portion of the tile.

12. The machine-replaceable plasma-facing tile apparatus of claim 1, wherein the tile-support tube is configured to provide direct contact between coolant from the at least one coolant channel and the back portion of the tile.

13. The machine-replaceable plasma-facing tile apparatus of claim 1, wherein the tile-support tube further comprises at least one guard vacuum region.

14. The machine-replaceable plasma-facing tile apparatus of claim 1, wherein the tile-support tube is manufactured from international thermonuclear experimental reactor-grade (ITER-grade) stainless steel.

15. The machine-replaceable plasma-facing tile apparatus of claim 1, wherein the tile is hollow.

16. The machine-replaceable plasma-facing tile apparatus of claim 1, wherein the spring is a captive spring.

17. The machine-replaceable plasma-facing tile apparatus of claim 1, wherein the tile-support tube further comprises at least one vacuum seal.

18. The machine-replaceable plasma-facing tile apparatus of claim 1, wherein the tile-support tube is manufactured from copper (Cu).

19. The machine-replaceable plasma-facing tile apparatus of claim 1, wherein the tile-support tube further comprises at least one first vacuum seal and at least one second vacuum seal.

20. The machine-replaceable plasma-facing tile apparatus of claim 16, wherein each of the at least two sets of shoulders comprises at least one coolant passage.

* * * * *